Aug. 15, 1950

H. HARRISON 2,518,685

MECHANISM FOR FOCUSING AND SIZING IMAGES

Filed Sept. 10, 1947

HENRY HARRISON
INVENTOR

BY *Newton M. Perrins*
*J. Griffin Little*
ATTORNEYS

Patented Aug. 15, 1950

2,518,685

UNITED STATES PATENT OFFICE 2,518,685

MECHANISM FOR FOCUSING AND SIZING IMAGES

Henry Harrison, Rochester, N. Y., assignor to Eastman Kodak Company, Rochester, N. Y., a corporation of New Jersey Application September 10, 1947, Serial No. 773,201

12 Claims. (Cl. 88—24)

The present invention relates to photographic instruments, and more particularly to a focusing mechanism for an enlarger or similar apparatus.

Adjustment of enlargers involves the simultaneous sizing and focusing of the image. The image can be sized while it remains in focus, and this is the principle of the autofocusing devices. On the other hand, the image can be sized without regard to focus and then sharpened or focused while it remains in size. This second possibility, which does not seem to have been widely used, is a subject of the present invention. The structure employed comprises a threaded rod arranged parallel to the axis of the enlarger, and an inverted cone positioned adjacent the rod but with the axis thereof inclined to the axis of the rod. The negative carrier and the projector lens of the enlarger are separately connected both to the rod and the cone so that when the rod and cone are rotated, the lens and carrier are moved in a definite relation to size and focus the image. In one modification, the actual cone apex is positioned substantially in the plane of the easel, while in another embodiment the effective apex is adjustable along the cone axis.

The present invention has, as its principal object, the provision of a novel mechanism for sizing and focusing images formed by the enlarger.

A further object of the invention is the provision of a focusing mechanism which permits separately sizing and focusing of the image.

Still another object of the invention is the provision of focusing mechanism which is rugged, comprises few parts which are not subject to appreciable wear so that the parts remain in their proper relative positions over a long period of time, and is highly effective in use.

Yet another object of the invention is the provision of an arrangement by which the actual apex of the cone will be maintained in one position relative to the easel, while the effective apex of cone may be adjusted along the cone axis.

To these, and other ends, the invention resides in certain improvements and combinations of parts, all as will be hereinafter more fully described, the novel features being pointed out in the claims at the end of the specification.

Figure 1:
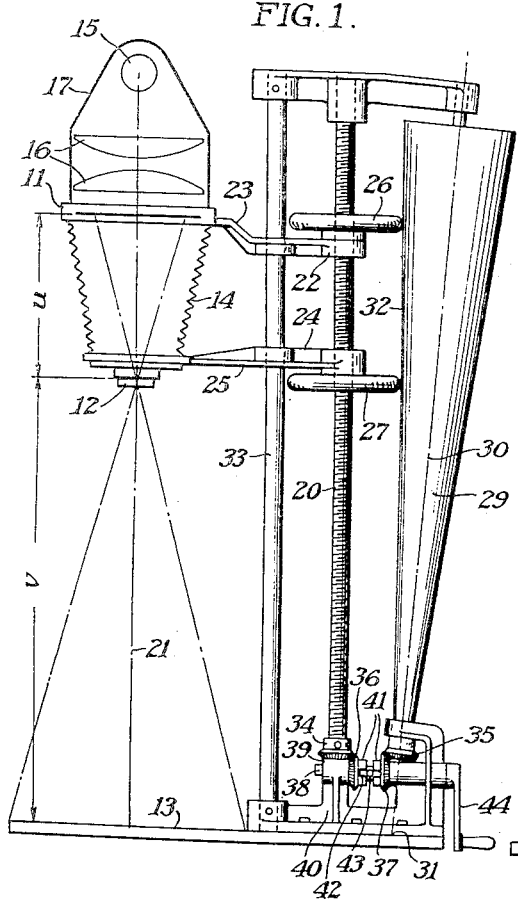
Fig. 1 is a side elevation view of an enlarger, showing the relation thereto of a focusing mechanism constructed in accordance with one embodiment of the invention.
Figure 4:
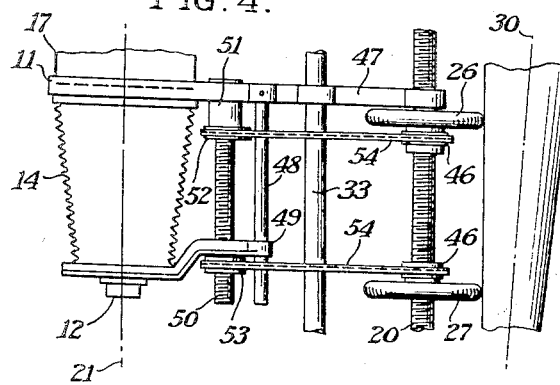
Figure 3:
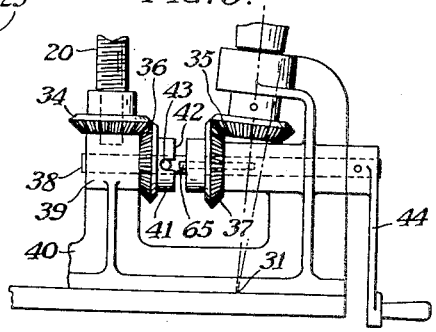

Fig. 3 is a view of the lower end of the focusing mechanism illustrated in Fig. 1, showing an arrangement for coupling certain elements of the focusing mechanism to provide a means for shifting the effective apex of the cone; and Fig. 4 is a partial view of the enlarger and focusing mechanism illustrated in Fig. 1, showing another method of connecting the rotatable rollers to the negative carrier and the projection lens.

Similar reference numerals throughout the various figures indicate the same parts.

The focusing mechanism of the present invention may be used with an enlarger having a negative carrier 11 in which is positioned a negative, not shown, the image of which is to be projected by a projection lens 12 onto the paper easel, or image-receiving member 13. The carrier 11 and lens 12 are connected by an expanding bellows 14, of well known construction, which permits the spacing between the carrier and the lens to be varied, for purposes well known to those in the art. The negative may be illuminated by a lamp 15 and condenser lenses 16 positioned in a housing 17 extending upwardly and supported by the negative carrier.

The above described enlarger may be of any suitable and well known construction and does not constitute a part of the present invention. Therefore, this particular enlarger construction is shown only for the purpose of illustrating one form of enlarger with which the focusing mechanism of the present invention may be used, and is not intended as a limitation.

In the arrangement shown in Fig. 1, if $u$ is the distance from the negative or object in the negative carrier 11 to the rear nodal point of lens 12, and $v$ is the distance from the front lens nodal point to the plane of the easel 13 on which the image of the negative is to be projected, and $m$ is the magnification, then, as is well known, $$u = \frac{v}{m}$$

When $u$ varies with some parameter $t$ (turns of cone) which is controlled by a hand wheel or similar device, $$\frac{du}{dt} = \frac{1}{m}\frac{dv}{dt}$$

expresses the condition that $m$ is a constant (constant picture or image size). This last equation can also be written $$\frac{du}{dt}/u = \frac{dv}{dt}/v$$

which states that $$\frac{du}{dt}$$

the rate of change of $u$, bears the same relation to $u$ that $$\frac{dv}{dt}$$

the rate of change of $v$, bears to $v$.

A mechanism which carries out the relation developed above is shown in Fig. 1 of the drawings in which a threaded rod 20 is positioned to one side of and preferably substantially parallel to the optical axis 21 of the enlarger. The rod has threadably mounted thereon an upper support 22 which is connected by a bracket 23 to the negative carrier 11. A lower support 24 also threadably engages the rod 20 and is connected by a bracket 25 to the projection lens 12. The supports 22 and 24 have mounted thereon, for movement therewith, rollers 26 and 27 respectively of equal outer diameters, the purpose of which will be later pointed out. The upper roller 26 is in the plane of the negative carrier, while the lower roller 27 is in the plane of the upper nodal point of lens 12. As the pitch of the thread of rod 20 is constant throughout its length, it is apparent that the rotation of the rod will move the supports 22 and 24, with rollers 26 and 27, at a uniform rate along the rod. Such uniform movement will be transmitted through the brackets 23 and 25 to move the negative carrier 11 and the lens 12 axially as a unit and at the same rate. As the rate of movment of the carrier and lens is the same, it is apparent that the rotation of the rod 20 will shift the axial positions of the carrier and lens but without altering the spacing therebetween. In other words, the value $u$ will remain constant when the rod 20 is rotated.

While the spacing ($u$) remains constant, the axial position of the carrier and lens will vary relative to the easel to alter the size of the negative image on the easel, as is apparent to those in the art. Thus the rotation of the rod 20 serves to move the carrier and easel as a unit and equal distances to secure an image of the desired size. During this sizing operation, the focus of the image is also changed so that the rotation of the rod changes both the size and focus. However at one size only the image would be in focus, but at all other sizes it will be out of focus. However, the rod is rotated only until the desired size is obtained, and at that time the image is out of focus. Thus the primary function of the rod rotation is to move the carrier and lens as a unit until the desired image size is obtained. Therefore, the rod 20 may be broadly considered as being used only to size the image. After the image has been thus sized, it is necessary to bring the sized image into focus.

To secure this focusing result, the present invention provides an inverted cone 29, the axis 30 of which is inclined to the axis 21 and the rod 20. The cone is so positioned that the apex 31 thereof is positioned above the easel 13, a distance equal to the nodal point separation of lens 12, as will be apparent from inspection of Fig. 1, and as best shown in Fig. 3, while the surface 32 of the cone engages the rollers 26 and 27 to rotate the latter when the cone is rotated about its axis in a manner to be later described. Due to the varying diameter of the cone, axially spaced points on the surface 32 of the cone will have the same angular speed but different lineal speeds when the cone is rotated. Therefore, as the rollers 26 and 27 are spaced along the surface of the cone, rotation of the latter will impart different relative rotative speeds to the rollers 26 and 27, as is apparent. This differential rotation will cause the rollers to move relative to each other along the rod 20, and this relative movement of the rollers 26 and 27 will be transmitted to the carrier and lens to move the lens and carrier relatively to vary the spacing therebetween, as will be readily apparent. Such movement of the lens and carrier is continued until the sized image is focused in accordance with the last preceding equation.

Thus the rotation of the rod 20 serves to move the carrier and lens axially as a unit and at the same rate but without altering their spacing to size the image on the easel. On the other hand, the rotation of the cone serves to move the carrier and lens axially at the required different speeds to change the spacing to bring the sized image into sharp focus. By means of this mechanism, one rotative element (rod 20) is utilized to size the image, while the second rotative element (cone 29) serves to focus the sized image. During the axial movements, the brackets 23 and 25 are guided by a supporting rod 33 which extends upwardly from the easel and through aligned holes in the brackets.

The rod and cone may be rotated by separate hand wheels, but it is preferred to provide a single mechanism which may be connected selectively to the rod or cone to rotate either member individually. To secure this result, the lower ends of the rod 20 and cone 29 are provided with bevel gears 34 and 35 which mesh with annular or ring gears 36 and 37 in which is slidably mounted a shaft 38 supported in spaced bearing 39 formed on a supporting bracket 40, the gears 36 and 37 being secured to the bearing in a suitable and well known manner. Each gear 36 and 37 is provided with an axially extended collar 41 which has an open end slot 42 adapted to receive a pin 43 carried by shaft 38. As the shaft is slid to its extreme leftward position, the pin 43 will enter slot 42 of gear 36 to clutch the rod 20 to the shaft 38 so that on rotation of the latter the rod 20 may be rotated. On the other hand, an extreme rightward movement of the shaft 38 will disconnect the shaft from rod 20, but will move the pin 43 into the slot 42 of the gear 37 to clutch the cone 29 to the shaft so that the rotation of the latter will now rotate the cone. Thus, either the rod or the cone may be connected selectively and separately to the shaft so that upon rotation of the latter the connected member is rotated while the other member idles. A handle 44 is connected to the right end of the shaft and serves both to axially shift and rotate the shaft.

Fig. 4 shows a modified arrangement in which each of the rollers 26 and 27 has secured thereto a sprocket or pulley 46. The upper roller 26 is carried by a radially extending arm 47 slidable on the main supporting column or rod 33 and connected to the negative carrier 11. The arm 47, adjacent the negative carrier, has secured thereto a depending rod 48 on the lower end of which is slidably mounted a bracket 49 connected to the lens 12. A short threaded rod 50 has the upper end thereof secured to the arm 47 by means of spacing collars 51, while the lower end extends through the bracket 50. Upper and lower sprockets or pulleys 52 and 53 are attached to the arm 47 and bracket 49 respectively and are connected to the sprockets or pulleys 46 by chains or belts 54. The sprocket 52 is rigidly attached to rod 50.

With the modified arrangement shown in Fig. 4, a rotation of the rod 20 causes the rollers 26 and 27 to move along the rod at the same rate and without changing the spacing. This axial movement of the roller 26 serves to shift the arm 47; and, as the carrier 11 is directly connected to the arm 47 and the lens 12 is connected thereto through bracket 49 and rod 48, the carrier and lens will be moved axially as a unit but without changing the spacing therebetween. However, when the cone is rotated, a differential rotation is imparted to the rollers 26 and 27 and this differential rotation is transmitted by the belts or chains 54 to impart a corresponding differential rotation to sprockets 52 and 53 to cause the sprockets 53 to move along rod 50 to cause a change in the spacing of the carrier 11 and lens 12. Thus, as in Fig. 1, the rotation of rod 20 moves the carrier and lens axially as a unit and at the same rate but without changing the spacing thereof to size the picture, but the rotation of the cone imparts a differential axial movement to the carrier and lens to vary the spacing to focus the sized picture.

In the arrangement shown in Fig. 1 and above described, $$\frac{dv}{dt}$$

is proportional to $v$ because the diameter of the cone 29 is proportional to $v$ and $t$ is the turns of the cone, so that with the arrangement of Fig. 1 the apex of the cone must be substantially in the plane of the easel. Also $$\frac{du}{dt}$$

is proportional to $u$ because the difference in cone diameters between the rollers is proportional to $u$. The factor of proportionality is the same for $$\frac{du}{dt}/u$$

and $$\frac{dv}{dt}/v$$

because the rollers have the same outside diameter and are threaded on the same rod and run on the same cone surface.

It can be shown that auto-focusing can be mechanized by a very similar system. However in this system, the positions of wheels 26 and 27 are quite different and the functions of the parts are not the same as in Fig. 1. Then taking $x=u-f$ and $y=v-f$, where $f$ is the focal length of the lens 12, in terms of $x$ and $y$, the condition of focus can be written as $xy=f^2$; solving for $x$ and differentiating with respect to $t$, holding $f$ constant, gives $$\frac{dx}{dt}=-\frac{dy}{dt}\frac{f^2}{y^2}$$

Dividing both sides by $x$ gives $$\frac{dx}{dt}/x=-\frac{dy}{dt}/y$$

which states that, if a system in focus is moved in such a way that $$\frac{dx}{dt}$$

bears the same relation to $x$ that $$-\frac{dy}{dt}$$

bears to $y$, the system will remain in focus.

Figure 2:
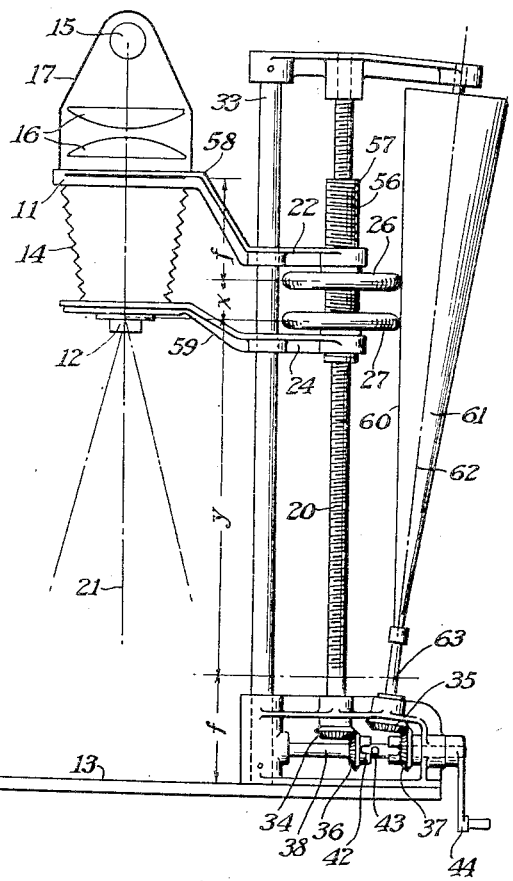
Fig. 2 is a view similar to Fig. 1, showing a modified form of the focusing mechanism.

The mechanism which gives auto-focusing according to the second analysis is shown in Fig. 2. In this modified construction, parts corresponding to those in Fig. 1 will be designated by the same numbers. In order to secure the desired result, the lower roller 27 is threaded onto the rod 20 and has attached thereto an exteriorly threaded bushing 56, the thread 57 of which is the same pitch as that of rod 20 but of opposite hand. The upper roller 26, on the other hand, is threadably mounted on the bushing 56 and is positioned below the negative carrier at a distance $f$. Thus the roller 27 is mounted directly on the rod while the roller 26 is carried by the bushing which, in turn, is connected to and moves as a unit with the roller 27. The reason for mounting collar 27 on rod 20 and roller 26 on bushing 56 is to provide a contrary rotation which will account the minus (—) sign of the equation of line 10 above.

Like Fig. 1, the rollers 26 and 27 have secured thereto brackets 58 and 59 which connect the rollers to the negative carrier and lens, respectively. As bushing 56 is only threaded exteriorly, it merely slides, without rotating, on rod 20 when wheel 27 rides upon and down on rod 20. When the rod 20 is rotated, the lower roller 27 and the bushing 56, with its roller 26, will be moved axially so that the two rollers are moved as a unit and at the same speed. The result is that the negative carrier and lens will be moved axially as a unit without changing the spacing therebetween. As the lens and negative carried are moved as a unit along rod 20, upon rotation of the latter, there is some point on rod 20 at which the image will be in focus initially. This adjustment could be a factory adjustment which focuses the image initially, after which it is not necessary to rotate rod 20. From this point on, as the size of the image is being changed, the correct relative motions are being given to parts 22 and 24 by the cooperation between cone 61, rod 20 and bushing 56, in accordance with the equation in line 10, page 8 so that the image always remains in focus at all times while the size is being varied, all of which will be presently described.

In addition to focusing the image, the latter must also be sized. To secure this result the rollers 26 and 27 engage the surface 60 of the cone 61 the axis 62 of which is inclined to the rod 20 and the axis 21 as in Fig. 1. However, the apex 63 of the cone 60 is not in the plane of the easel 13 as is Fig. 1, but, on the contrary, it is positioned a distance $f$ above the easel. With this arrangement, when the cone 61 is rotated, a differential rotation is imparted to the rollers 26 and 27 which shifts the carrier 11 and lens 12 axially while, at the same time, varying the spacing therebetween in accordance with the last preceding equation. Hence as the cone is rotated, the image always remains in focus as the size changes. Thus, in this embodiment, it will be seen that the cone mechanism can be considered to be the sizing device, and the apparatus constitutes an auto-focusing enlarger.

In the mechanism of Fig. 2

$$\frac{dy}{dt}$$

is proportional to $y$ because the diameter of the cone 61 at the lower roller 27 is proportional to the distance $y$, since the apex of the cone is one focal length above the easel. Also $$\frac{dx}{dt}$$

is proportional to $x$ because the difference in diameter of the cone between the rollers is proportional to $x$, since the upper roller 26 is one focal length below the negative carrier. The factor of proportionality $$\frac{dx}{dt}/x$$

is equal to $$-\frac{dy}{dt}/y$$

because the bushing 56 is the same pitch as the rod 20 but of opposite hand and both rollers roll on the same cone surface. Except for slippage of the rollers on the cone surface, once the adjustment is made, the size of the image can be varied and also kept in focus by the rotation of the cone 61.

Returning again to the system shown in Fig. 1, if slippage occurs between the rollers and the cone, this slippage will result in a small error in size. However, in the auto-focusing arrangement illustrated in Fig. 2, the relative slippage of the two wheels against the cone will result in some defocusing of the system. Also the first system is independent of the focal length of the lens, and can even be used with interchangeable lenses, and can be used to give controlled defocusing for special effects. Whereas in the second system the mechanism is tied up with a specific focal length.

It is possible that mechanical considerations, the diameter of the cone being too small at the lower or driven end, or the drive mechanism being in the way of the lower roller at short focal lengths and small magnifications, will make it desirable to shift the apex of the cone out of the plane of the easel. This can be done by gearing or coupling the cone and rod together as illustrated in Fig. 3 so as to rotate both at the same time so that both the cone and the rod are driven to maintain size while focusing. If the actual apex of the cone is shifted to the top of the enlarger, but the effective apex is maintained in the plane of the easel by gearing between the threaded rod 20 and the cone 29, the following valuable result is obtained: When sizing by turning the cone alone the approximate focus is maintained, but when focusing by turning both the cone and the rod the preset size is exactly maintained except for slippage of the rollers on the cone surface.

If $D$ = the maximum diameter of cone, and
$y$ = distance from apex of cone to lens, and
$p$ = pitch of threaded rod 20, and
$d$ = outside diameter of roller 26 and 27, and
$q$ = ratio of speed of rod to speed of cone, and
$S$ = speed of cone (R. P. M.), and
$L$ = length of cone from apex to maximum diameter Then speed of roller due to cone motion $$=\frac{Sy\frac{D}{Lp}}{d}$$

and speed of roller due to threaded rod $=Sqp$
and speed of roller $$=\frac{dy}{dt}=\frac{Sy\frac{D}{Lp}}{d}+Sqp$$

$$=\frac{DpS}{LD}\left(y+\frac{dLq}{D}\right)$$

$$=\frac{d}{dt}\left(y+\frac{dLq}{D}\right)$$

Therefore, the effective apex of the cone is shifted an amout $$\frac{dLq}{D}$$

when the cone and rod are geared together.

To secure this shifting of the apex of the cone, the shaft 38, Figs. 1 and 3, is permanently connected to the cone 29 by means of a key 65 which connects the shaft to the gear 37 so that in any axial position of the shaft the latter will always be connected to the cone to rotate the latter upon rotation of the shaft. When the shaft 38 is slid to the extreme leftward position, Fig. 3, the pin 43 will enter the slot 42 or collar 41 carried by gear 36 so that the latter will also be connected to the shaft 38 so that both the rod and cone will be rotated at the same time. This simultaneous rotation of the cone and rod will serve to shift the effective apex of the cone without moving the actual apex.

While this invention has been described as related to an enlarger, it is also applicable to many other optical instruments in which both conjugates are finite. Examples include process cameras, microscope cameras, contour projectors, and similar devices. Also, while in the preferred arrangement, the rod 20 is arranged parallel to the axis 21. However, the mechanism will function even with the rod 20 in an inclined position provided the rod has a component which is parallel to the axis 20. In other words, the device will function when the rod 20 is in any position except at right angles to the axis 21.

While certain embodiments of the invention have been disclosed, it is to be understood that the inventive idea may be carried out in a number of ways. Therefore, this application is not to be limited to the precise details described, but is intended to cover all variations and modifications thereof which fall within the scope of the appended claims.

I claim:

1. In an optical instrument for projecting images at finite magnification, the combination with an image receiving member and a projection lens and an illuminated object arranged in spaced relation to and in optical alignment with said member, of means operatively connected to said lens and object including a rotatable threaded rod for moving said lens and object relative to said member to size said image on said member while allowing the focus to vary, a pair of rollers threadably mounted on said rod, means for connecting one of said rollers to said lens, means for connecting the other roller separately to said object, a cone frictionally contacting said rollers, and means for rotating said cone to rotate said rollers at different rates to move said lens and object relative to said member to focus said image while maintaining said size.

2. In an optical instrument for projecting images at finite magnification, the combination with an image receiving member and a projection lens and an illuminated object arranged in spaced relation to and in optical alignment with said member, of means including a rotatable threaded member for moving said lens and object axially as a unit to size said image on said member, and means including an inclined tapered roller cooperating with said first means to change the spacing of said lens and object to focus the image on said member while maintaining the image size.

3. In an optical instrument for projecting images at finite magnification, the combination with an image receiving member and a projection lens and an illuminated object arranged in spaced relation to and in optical alignment with said member, of means including a threaded member arranged parallel to the axis of said lens for moving said lens and object axially relative to said member for maintaining said image in approximate focus while sizing the image on said member, and means including a tapered roller operatively connected to said lens and object for moving said lens and object relative to said member for maintaining said size exactly while sharply focusing the image.

4. In an optical instrument for projecting images at finite magnification, the combination with an image receiving member, and a projection lens and an illuminated object arranged in spaced relation to and in optical alignment with said member, of means including a rotatable threaded member arranged parallel to the axis of said lens and operatively connected to said lens and object for moving said lens and object axially as a unit and relative to the member without changing the spacing between the lens and object, and means including a tapered roller inclined to said axis for moving said lens and object axially and relative to each other to vary said spacing, one of said means performing the operation of sizing the image on said member and the other means performing the operation of focusing the image on the member, said second means performing only one of said operations.

5. In an optical instrument for projecting images at finite magnification, the combination with an image receiving member, and a projection lens and an illuminated object arranged in spaced relation to and in optical alignment with said member, of a rotatable threaded rod means, supports for said lens and object connected to said rod, a member for rotating said rod for moving said supports therealong to shift said lens and object axially without altering the spacing therebetween, a roller carried by each support and threadably connected to said rod, and means engaging said rollers and adapted to rotate the latter at different rates to shift said supports relatively along said rod to move said lens and object axially and vary simultaneously said spacing, the operation of one of said means sizing the image on said member while the other means focuses the image on said member.

6. In an enlarger, the combination with an image receiving easel, and a projection lens and negative carrier arranged in spaced relation to and in optical alignment with said easel, of a rotatable threaded rod member positioned so as to have a component parallel to the optical axis of the enlarger, a pair of spaced supports threadably engaging said rod and operatively connected to said lens and carrier, a member for rotating said rod to shift said supports therealong to move said lens and carrier axially as a unit without altering the spacing therebetween, a roller carried by each support and threadably connected to said rod, a rotatable cone member arranged with its axis inclined to said optical axis and rod and having the face thereof engage said rollers, and means for rotating said cone to impart a relative rotation to said rollers to move said supports relatively along said rod to shift said lens and carrier axially and relatively to vary said spacing, the rotation of one of said members being utilized to position said lens and carrier to size the image while the rotation of the other member adjusts the positions of said lens and carrier to focus the image.

7. In an enlarger, the combination with an image receiving easel, and a projection lens and negative carrier arranged in spaced relation to and in optical alignment with said easel, of a threaded rod, a pair of supporting members threadably connected to said rod, means for connecting said lens and carrier separately to said supports for movement therewith, means to rotate said rod to move said supports therewith to shift said lens and carrier axially without altering the distance therebetween to secure an image of a desired size on said easel, a roller carried by each support and threadably engaging said rod, and means for rotating said rollers simultaneously and at different rates to move said supports relatively along said rod to shift said lens and carrier axially at different rates to vary said spacing to focus said image without changing the size thereof.

8. In an enlarger, the combination with an image receiving easel, and a projection lens and negative carrier arranged in spaced relation above and in optical alignment with said easel, of separate supports for said lens and carrier, a threaded rod member to which said supports are operatively connected so that rotation of said rod will move said lens and carrier without varying the spacing therebetween, rotatable elements carried by said supports and threadably connected to said rod, a cone member having the axis thereof inclined to the rod member and with the face thereof in engagement with said elements so that rotation of said cone will rotate said elements at different rates to shift said lens and carrier relatively to vary said spacing, an actuating shaft, and clutches for connecting said shaft selectively to said rod and cone to permit the rotation of either of said members by said shaft.

9. In an enlarger, the combination with an image receiving easel, and a projecting lens and negative carrier arranged in spaced relation above and in optical alignment with said easel, of a threaded rod member, supports for said lens and carrier threadably connected to said rod member so that rotation of the latter will move said lens and carrier axially without altering the spacing therebetween, a roller carried by each support and threadably connected to said rod, a cone member having the axis thereof inclined to said rod and the surface engaging said rollers so that rotation of said cone about its axis will rotate said rollers at different rates to move said lens and carrier axially at different speeds to vary said spacing, the rotation of one of said members serving to size the image on said easel while the rotation of the other member will focus the image on the easel, the actual apex of the cone being in a definite relation to said easel, an operating member, and means for coupling the cone and rod to said operating member so that actuation of the latter will rotate both the cone and rod to shift the effective apex of the cone to impart a translation to the rollers equivalent to that secured by shifting the actual apex so that an approximate auto-focusing action may be accomplished while sizing the image on the easel.

10. In an optical instrument for projecting images at finite magnification, the combination with the image receiving member and a projection lens and an illuminated object arranged in spaced relation to and in optical alignment with said member, of means including a threaded element operatively connected to and for moving said lens and object relative to said member, and a second means including a tapered roller cooperating with parts of said first means for moving said lens and object relative to said member, one of said means moving said lens and object as a unit relative to said member and the other of said means moving said lens and object relative to each other, one of said movements serving to focus the image on said member and the other movement serving to size the image on said member.

11. In an optical instrument for projecting images at finite magnification, the combination with an image receiving member and a projection lens and an illuminated object arranged in spaced relation to and in optical alignment with said member, of a rotatable threaded rod element, means for operatively connecting said lens and object separately to said element so that rotation of the latter will move said lens and object relative to said member, and a rotatable cone element cooperating with parts of said means so that rotation of said cone element will move said lens and object relative to said member, the rotation of one of said elements serving to move said lens and object as a unit and without varying the spacing therebetween while the rotation of the other elements serves to move said lens and object relatively to vary the spacing therebetween, one of said movements serving to focus the image on said member and the other movement sizing the image on the member.

12. In an optical instrument for projecting images at finite magnification, the combination with an image receiving member and a projection lens and an illuminated object arranged in spaced relation to and in optical alignment with said member, of a rotatable threaded rod element, means for operatively connecting said lens and object separately to said element so that rotation of the latter will move said lens and object relative to said member, rollers carried by said connecting means, and a rotatable cone element engaging said rollers so that rotation of said cone element will move said lens and object relative to said member, the rotation of one of said elements serving to non-rotatably move said rollers along said rod to move said lens and object as a unit without varying the space therebetween while the rotation of the other element serves to rotate said rollers to vary the spacing between said lens and object, one of said movements serving to focus the image on said member and the other movement sizing the image on said member.

HENRY HARRISON.

REFERENCES CITED

The following references are of record in the file of this patent:

UNITED STATES PATENTS

| Number | Name | Date |
|---|---|---|
| 1,438,790 | Schwanhausser | Dec. 12, 1922 |
| 1,758,240 | Roach | May 13, 1930 |
| 2,324,842 | Huebner | July 20, 1943 |